United States Patent
Liu et al.

(10) Patent No.: US 9,715,262 B2
(45) Date of Patent: Jul. 25, 2017

(54) MITIGATION OF POWER SUPPLY DISTURBANCE FOR WIRED-LINE TRANSMITTERS

(71) Applicant: Apple Inc., Cupertino, CA (US)

(72) Inventors: Wenbo Liu, Santa Clara, CA (US);
Raman S. Thiara, San Jose, CA (US);
Shingo Hatanaka, San Jose, CA (US)

(73) Assignee: Apple Inc., Cupertino, CA (US)

( * ) Notice: Subject to any disclaimer, the term of this patent is extended or adjusted under 35 U.S.C. 154(b) by 442 days.

(21) Appl. No.: 14/471,759

(22) Filed: Aug. 28, 2014

(65) Prior Publication Data

US 2016/0062430 A1    Mar. 3, 2016

(51) Int. Cl.
*G06F 1/26* (2006.01)
*H04L 7/08* (2006.01)
*H04L 25/03* (2006.01)
*H04L 25/02* (2006.01)

(52) U.S. Cl.
CPC .......... *G06F 1/266* (2013.01); *H04L 25/0286* (2013.01); *H04L 25/03* (2013.01)

(58) Field of Classification Search
CPC . G06F 1/266; H04L 25/0264; H04L 25/0286; H04L 25/03; H04L 2027/0051; H04L 7/08; H03K 19/00
USPC ............ 326/21, 82–87, 93–98; 375/229–232
See application file for complete search history.

(56) References Cited

U.S. PATENT DOCUMENTS

| | | | |
|---|---|---|---|
| 7,719,307 B2 * | 5/2010 | Lee .................. | H03K 19/01852 326/30 |
| 8,266,355 B2 * | 9/2012 | Lee ..................... | B41J 2/17546 710/104 |
| 8,536,837 B1 | 9/2013 | Jaoude et al. | |
| 8,692,578 B2 * | 4/2014 | Lai ........................ | H03F 1/0211 326/87 |
| 2009/0206889 A1 | 8/2009 | Reohr et al. | |
| 2010/0029228 A1 | 2/2010 | Holden et al. | |
| 2012/0149422 A1 | 6/2012 | Ye | |

* cited by examiner

*Primary Examiner* — Jimmy Vu
(74) *Attorney, Agent, or Firm* — Meyertons, Hood, Kivlin, Kowert & Goetzel, P.C.; Gareth M. Sampson; Lawrence J. Merkel

(57) ABSTRACT

A wired-line transmitter may include architecture that provides control of the current profile during power-up and/or power-down of the transmitter. The current profile may include a sloped ramp up during power-up and/or a sloped ramp down during power-down. The sloped ramps of the current profile mitigate supply bouncing during power-up and/or power-down. Individual enable signals may be derived from an enable signal provided to the transmitter. These individual enable signals may be provided (or turned off) in a time delayed (e.g., staggered) manner to provide the sloped ramps for the current profile.

20 Claims, 9 Drawing Sheets

MITIGATION OF POWER SUPPLY DISTURBANCE FOR WIRED-LINE TRANSMITTERS

BACKGROUND

1. Technical Field

Embodiments described herein relate to wired-line transmitters. More particularly, the embodiments described herein relate to systems and methods for mitigating power supply disturbances in wired-line transmitters.

2. Description of Related Art

Modern integrated wired-line transmitters for semiconductor devices (e.g., SoC devices) may achieve data rates up to Gb/s (gigabytes pers second) or higher (e.g., tens of Gb/s). Wired-line transmitters may be used in cost effective mediums such as microstrip and Cat5 cable. The use of wired-line transmitters in such mediums allows high-speed chip-to-chip communications in consumer electronics. The driver of wired-line transmitters is a major implementation that may directly drive the off-chip loading. A typical embodiment of drivers of a wired-line transmitter is shown in FIG. 1. Transmitter 100 may include a number, N, of identical legs with each leg including driver 102 and termination resistor 104 (with resistance R). Transmitter 100 may include logic gate 106 driven by input signal 108 and enable signal 110 on the input of the driver system and load 112 (with loading resistance $R_L$) on the output of the transmitter.

At Gb/s speeds, impedance control in transmitter 100 is required for maximum power delivery. Thus, the number of legs, N, and the resistance, $R_L$, of termination resistors 104 may be chosen such that the overall impedance (R/N) matches the loading resistance ($R_L$). The operation current may then be the supply voltage for drivers 102 (VDD) divided by twice the loading resistance (e.g., the operating current is VDD/(2 $R_L$). 50Ω (ohm) impedance matching may be typically used, which may provide an operation current that ranges from several mA (milliamps) to tens of mA depending on the signal swings required (as determined by different standards).

During power-up, the current of transmitter 100 may jump abruptly from 0 to full current, and vice versa during power-down. Due to the parasitic behavior of a chip package and/or board routing, the chip package and/or board routing may create tens of mV (millivolts), even hundreds of mV, disturbance on the power supply. The power supply disturbance may take a considerable amount of time to die out. This disturbance may not only degrade the driver's own jitter performance but also may affect other blocks on a chip (e.g., an SoC or a system on a chip) through the power supply, which may be hazardous in SoC environments.

FIG. 2 depicts a representation of an embodiment of typical SoC configuration 200. In certain embodiments, SoC configuration 200 includes board trace & package 202 coupled to power grid 204. Several components/devices may be located inside chip boundary 206 and be coupled to power grid 204 and/or each other. Examples of components/devices in SoC configuration 200 include, but are not limited to, clock generators 208, processor 210, coprocessor 212, RAM 214, Flash 216, JTAG connector 218, digital baseband 220, analog baseband 222, first I/O 224 with transmitter 226 and receiver 228, and second I/O 230 with transmitter 232 and receiver 234.

As shown in FIG. 2, transmitter 226 of first I/O 224 may kick (disturb) the power supply in power-up or power-down as marked by disturbance 236. Disturbance 236 may propagate throughout the power network to every neighbor in the same power domain, as shown by disturbances 238. Disturbances 238 may degrade the signal integrity of other transmitters, worsen the sensitivity of receivers, deteriorate clock jitter in clock generation circuitry (e.g., clock generators 208), and/or corrupt the timing of processors (e.g., processor 210 and/or coprocessor 212). Thus, mitigation of supply disturbances (such as disturbance 236) may be essential for proper operation of SoC configuration 200.

Conventional solutions to mitigate supply disturbances (e.g., disturbance 236) may include increasing on-chip decoupling capacitance (e.g., number of decoupling capacitors), increasing the number of bumps for the supply, and/or better chip packaging. These solutions may, however, be costly and somewhat ineffective in mitigating the disturbances.

SUMMARY

In certain embodiments, a transmitter of a semiconductor device is provided with a ramping current profile during power-up and/or power-down of the transmitter. During power-up, the ramping current profile may include a sloped ramp between onset of an enable signal and a selected time after the onset. During power-down, the ramping current profile may include a sloped ramp between shutdown of the enable signal and a selected time after the shutdown. Between power-up and power-down, the current may be substantially constant. In some embodiments, the sloped ramps include a convolution of a step function and a rectangular waveform to provide a substantially linear slope.

The transmitter may include architecture that provides the transmitter with the ramping current profile during power-up and/or power-down of the transmitter. In certain embodiments, the transmitter includes a number of driver legs in parallel with each driver leg being provided a distinct, individual enable signal. Each driver leg may include a driver and a termination resistor. The individual enable signals may be derived from the enable signal received by the transmitter. The transmitter architecture may provide each of the individual enable signals to each of the driver legs at different times, one after the other. In some embodiments, the individual enable signals are provided with a selected time delay between each signal. Thus, each driver leg is turned on individually with each successive driver leg being turned on after the previous driver leg is turned on at a time determined by the selected time delay. The selected time delay may be, for example, a clock period of a clock that controls timing of the individual enable signals.

In some embodiments, the transmitter includes a number of driver legs with the driver legs being divided into groups (or sets) of driver legs. Each group may include the same number of driver legs. The transmitter architecture may provide each of the individual enable signals to each of the groups of driver legs at different times (e.g., with a selected time delay between signals as set by the clock).

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
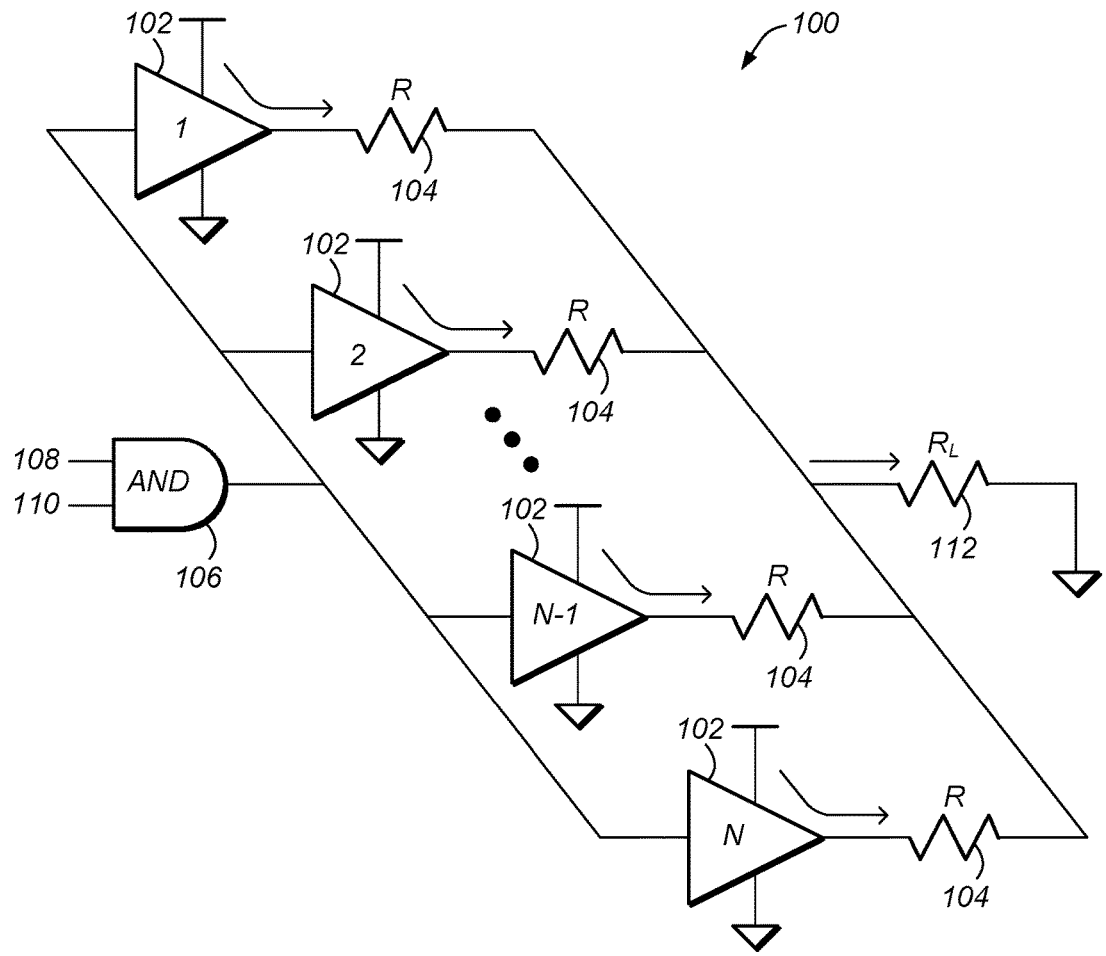
FIG. 1 depicts a typical embodiment of drivers of a wired-line transmitter.

While the embodiments described in this disclosure may be susceptible to various modifications and alternative forms, specific embodiments thereof are shown by way of example in the drawings and will herein be described in detail. The drawings may not be to scale. It should be understood that the drawings and detailed description thereto are not intended to limit the embodiments to the particular form disclosed, but to the contrary, the intention is to cover all modifications, equivalents and alternatives falling within the spirit and scope of the appended claims.

DETAILED DESCRIPTION OF EMBODIMENTS

Figure 2:
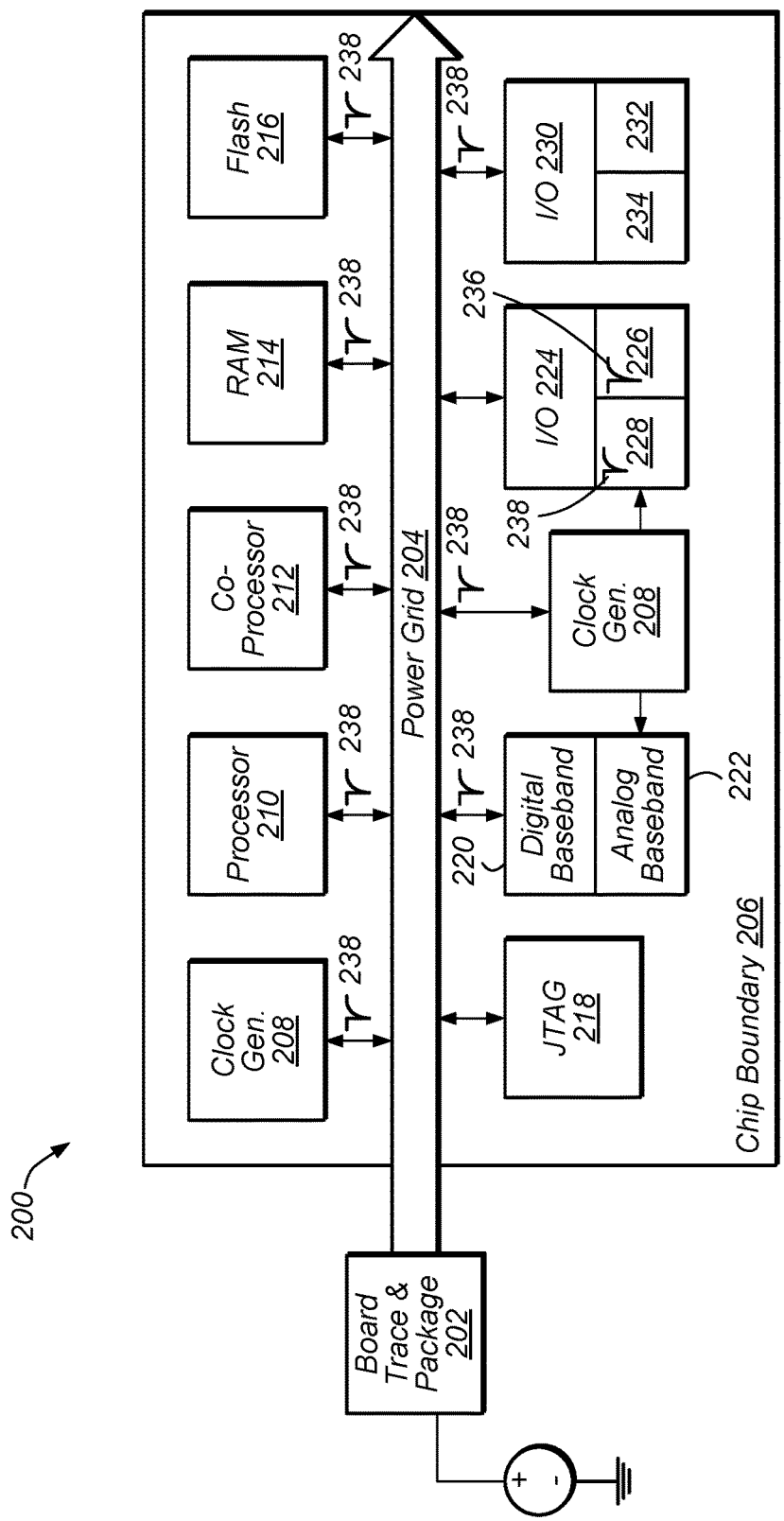
FIG. 2 depicts a representation of an embodiment of a typical SoC configuration.
Figure 3:
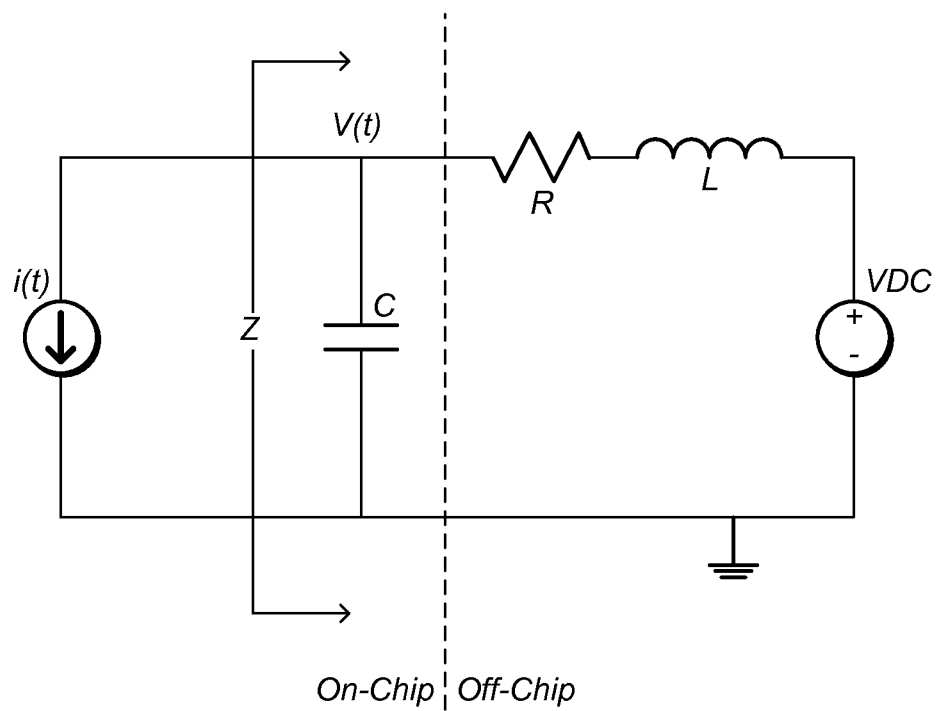
FIG. 3 depicts a representation of an exemplary embodiment of a model of a power supply disturbance.
Figure 4:
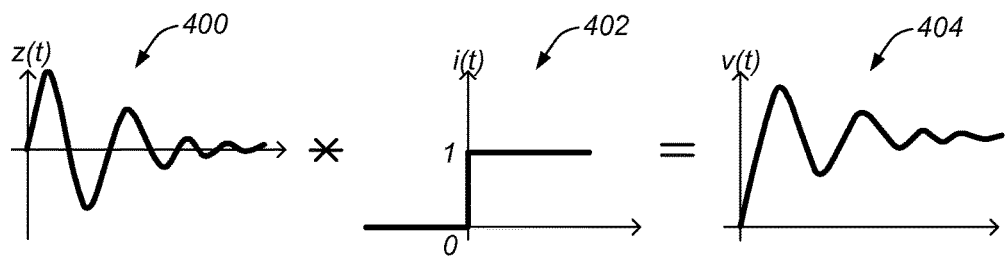
FIG. 4 depicts an embodiment of an impulse response, a step current profile, and a voltage response.

In certain embodiments, supply disturbances are mitigated by controlling the rising and/or falling slew rates of a current profile (e.g., the current profile is controlled when the drivers are powered up and/or powered down). FIG. 3 depicts a representation of an exemplary embodiment of a model of a power supply disturbance. In FIG. 3, the power supply network is modeled as a lossy lumped LC tank. R and L model the parasitic resistance and inductance of the package and the board traces, respectively, while C models the on-chip capacitance. The supply network impedance looking from the driver is Z with an impulse response z(t). The impulse response, z(t), is shown as impulse response 400 in FIG. 4. As shown in FIG. 3, the current source, i(t), is used to model the transmitter current (e.g., the wired-line transmitter current). In a conventional transmitter (such as shown in FIGS. 1 and 2), the power-up current profile is an abrupt profile modeled by a step function, as shown by 402 in FIG. 4.

The voltage response to i(t), v(t) (shown by 404 in FIG. 4), may be obtained by convoluting z(t) (400) with i(t) (402). An example of a close-form equation is shown in EQN. 1:

$$v(t) = \frac{2\xi}{C\omega_n} + \frac{1}{C\omega_n\sqrt{1-\xi^2}} e^{-\xi\omega_n t}\sin(\omega_n\sqrt{1-\xi^2}\,t + \theta); \quad (1)$$

-continued where $\omega_n = \dfrac{1}{\sqrt{LC}}$, $\xi = \dfrac{1}{2}R\sqrt{\dfrac{C}{L}}$, and $\theta = 2\tan^{-1}\dfrac{\sqrt{1-\xi^2}}{\xi}$ (with the 2nd term describing the bouncing in the voltage response $v(t)$).

Figure 5:
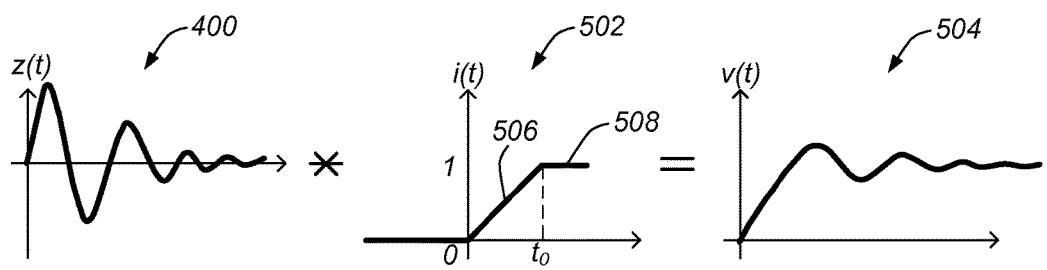
FIG. 5 depicts another embodiment of an impulse response, a selected (ramping) current profile, and a voltage response.

In certain embodiments, the bouncing magnitude (e.g., supply disturbance) is mitigated using a transmitter architecture (e.g., wired-line transmitter architecture) that provides a ramping current profile during power-up and/or power-down. FIG. 5 depicts an embodiment of ramping current profile 502. In certain embodiments, ramping current profile 502 is designed to include sloped ramp 506 for a selected time (e.g., transition time of $t_0$). After the selected time, ramping current profile 502 may have a substantially constant current as shown by 508 (e.g., a current with a magnitude of the step current shown in FIG. 4). As shown in FIG. 5, sloped ramp 506 has a substantially linear slope between startup (time=0 or the onset (startup) of an enable signal that signals startup of the transmitter) and $t_0$ (e.g., i(t) has a linear slope startup and $t_0$). In certain embodiments, a mirror of sloped ramp 506 is used at power-down to shut off power to the transmitter. For example, ramping current profile 502 may include the mirror of sloped ramp 506 at the end of a power cycle such that current to the transmitter powers down along the slope for the selected time (e.g., transition time of $t_0$) before complete power-down (shutdown) of the transmitter.

Using ramping current profile 502 with sloped ramp 506 at startup and/or shutdown may provide a smoother excitation that contains less high-frequency components and results in less time-doming supply bouncing, as shown by voltage response, v(t), depicted by 504 in FIG. 5. In an SoC environment, reducing the supply bouncing, as shown in FIG. 5, reduces transmitter-induced supply disturbances to other on-chip sensitive blocks (e.g., disturbances 236 and 238 shown in FIG. 2). Reducing the transmitter-induced supply disturbances to other on-chip sensitive blocks may increase the stability and/or robustness of SoC chips.

Figure 6:
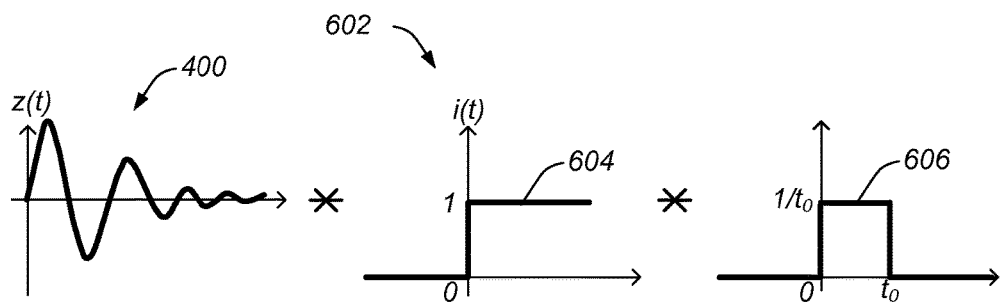
FIG. 6 depicts an embodiment of an impulse response and a current profile that is a convolution of a step function and a rectangular waveform.

In certain embodiments, sloped ramp 506 shown in FIG. 5 is a convolution of a step function and a rectangular waveform. FIG. 6 depicts i(t) (602) as a convolution of step function 604 and rectangular waveform 606. Rectangular waveform 606 may have a width of $t_0$ and a magnitude of $1/t_0$. Rectangular waveform 606 may be unitless. Convoluting the first two terms (z(t) (600) and step function 604) produces EQN. 1. Thus, ramping up the current using ramping current profile 502, depicted in FIG. 5, equivalently passes the step response to a sliding average window. A closed-form response may be shown as EQN. 2:

$$\text{For } t < t_0: v(t) = \frac{2\xi}{C\omega_n}\frac{t}{t_0} + \quad (2)$$

$$\frac{1}{(t_0\omega_n)C\omega_n\sqrt{1-\xi^2}}\left[\sin(3\theta) - e^{-\xi\omega_n t}\sin(\omega_n\sqrt{1-\xi^2}\,t + 3\theta)\right],$$

$$\text{For } t \geq t_0: v(t) = \frac{2\xi}{C\omega_n} + \frac{1}{(t_0\omega_n)C\omega_n\sqrt{1-\xi^2}}e^{-\xi\omega_n t}$$

-continued $$[e^{\xi\omega_n t_0}\sin(\omega_n\sqrt{1-\xi^2}\,(t-t_0)+3\theta) - \sin(\omega_n\sqrt{1-\xi^2}\,t+3\theta)].$$

The first term in EQN. 2 (for $t<t_0$) represents the steady state response to the ramp excitation (e.g., the startup ramp) while the second term represents the transient bouncing due to the RLC tank. The ringing frequency and the decaying time-constant in EQN. 2 are the same as EQN. 1. The magnitudes of these numbers, however, are attenuated by $t_0\omega_n$. This attenuation corresponds to the averaging effect of the rectangular waveform. In some embodiments, $t_0$ needs to be greater than $1/\omega_n$ to effectively attenuate the ringing magnitude, and the ringing magnitude will decrease linearly with $t_0$.

Figure 7:
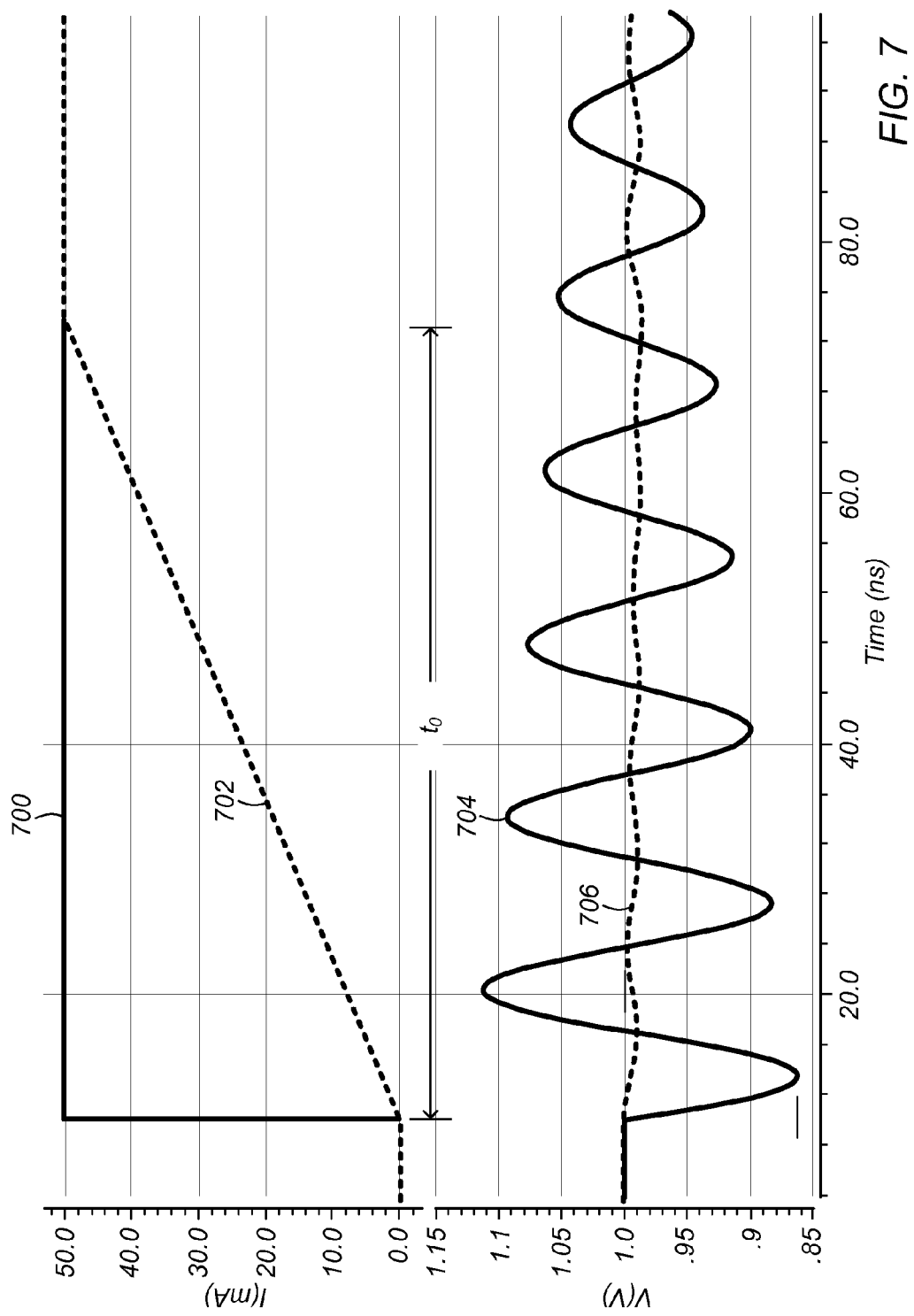
FIG. 7 depicts an example of results of a SPICE simulation using a ramping current profile.

FIG. 7 depicts an example of results of a SPICE simulation using the ramping current profile. The SPICE simulation compares the use of conventional step current profile 700 and ramping current profile 702, which has a startup ramp for a selected time, $t_0$. Conventional step current profile 700 produces supply voltage response 704 while ramping current profile 702 produces supply voltage response 706. As shown in FIG. 7, voltage response 706 has much less disturbance than voltage response 704, which is indicated by the magnitude of the curves for each response. In some embodiments, voltage response 706 may have a disturbance that is at least about 30 times reduced as compared to a disturbance of voltage response 704.

Figure 8:
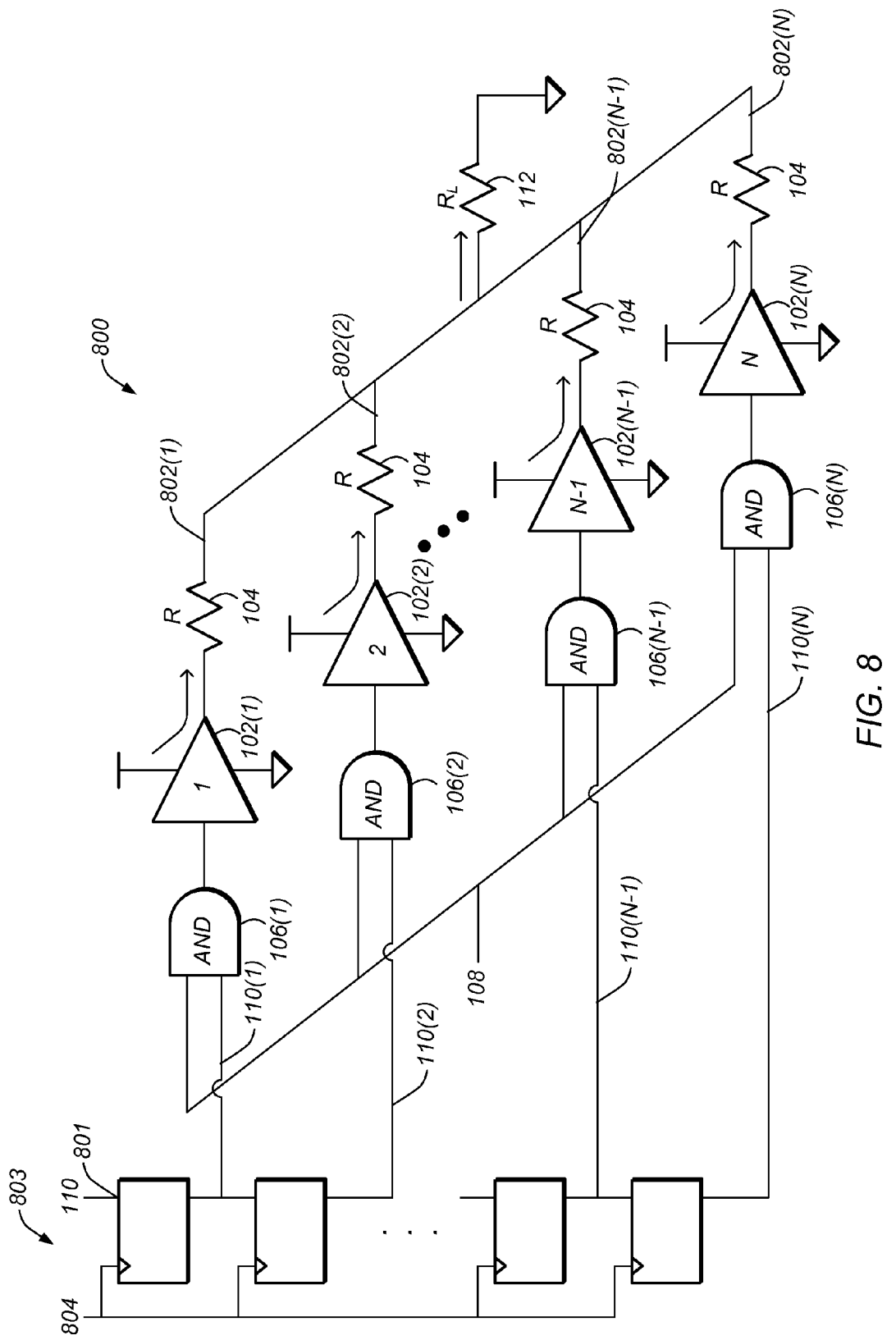
FIG. 8 depicts a representation of an embodiment of a transmitter architecture with a ramping current profile implemented by turning on driver legs one by one.

FIG. 8 depicts a representation of an embodiment of a transmitter architecture with a ramping current profile implemented by turning on driver legs one by one. Transmitter 800 may provide the ramping current profile (e.g., slew rate control of the current) during power-up and/or power-down functions. Power-up and/or power-down of transmitter 800 may be controlled using enable signal 110. Enable signal 110 may be input into transmitter 800 at input 801 on the transmitter. Onset of enable signal 110 may indicate power-up of transmitter 800 while shutdown of the enable signal (e.g., the enable signal turns off) may indicate power-down of the transmitter.

In certain embodiments, transmitter 800 includes N number of legs 802 (e.g., legs 802(1) through 802(N)). Each leg 802(1-N) includes driver 102(1-N) and termination resistor 104 (with resistance R). In certain embodiments, each leg 802 includes distinct logic gate 106 (e.g., each leg (1-N) has its own corresponding logic gate (1-N)). Logic gates 106 (1-N) may be provided with a single, shared input signal from input signal 108. In certain embodiments, logic gates 106 are "AND" logic gates needing both input signal 108 and enable signal 110 to provide an output signal to driver 102.

In certain embodiments, each logic gate 106 in each leg 802 receives a distinct (individual) enable signal 110 (e.g., the logic gates are inputs for individual enable signals for drivers 102). Individual enable signals 110(1-N) (e.g., enable signals 110(1) through 110(N)) may be derived from enable signal 110 and provided by shift register 803 (e.g., the individual enable signals may be derived from enable signal 110 with even phase shift by the shift register). Transmitter 800 then has N number of individual enable signals 110(1-N) provided to N number of logic gates 106 in N number of legs 802. In certain embodiments, the timing of providing individual enable signals 110(1-N) to each of logic gates 106(1-N) is controlled by clock 804. For example, a single, input enable signal (e.g., enable signal 110 that signals startup of transmitter 800) may be provided to the transmitter and clock 804 may control when (e.g., desired time intervals) individual enable signals 110(1-N) are provided to their respective logic gates 106(1-N). Controlling the individual enable signals allows clock 804 to control the timing of power-up and/or power-down of transmitter 800.

Figure 9:
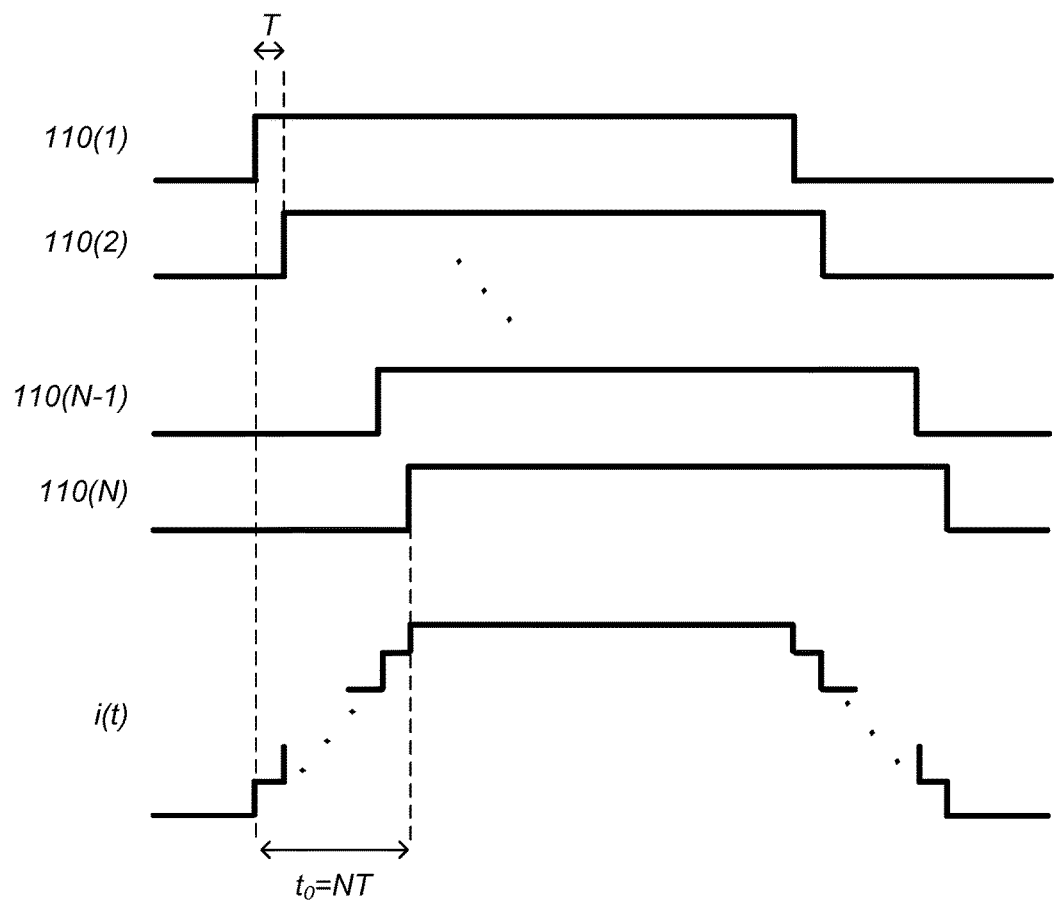
FIG. 9 depicts a timing diagram of individual enable signals controlled by a clock and a corresponding current profile for a transmitter.

FIG. 9 depicts a timing diagram of individual enable signals controlled by clock 804 and a corresponding current profile, i(t), for transmitter 800. In certain embodiments, as shown in FIG. 9, for every clock period (cycle) T, one additional individual enable signal 110(2-N) (e.g., delayed enable signals) is provided after the initial individual enable signal 110(1). Thus, full power-on of transmitter 800 takes N clock periods such that $t_0=N\times T$, where $t_0$ is the transition time or startup time of the transmitter. Similarly, $t_0$ may be the time for power-down of transmitter 800 as each individual enable signal 110(1-N) is turned off for power-down after enable signal 110 is turned off (e.g., enable signal 110 is no longer received by the transmitter). In certain embodiments, $t_0$ is adjusted by changing the clock period (7) and/or the number of flip-flops between adjacent phases.

Figure 10:
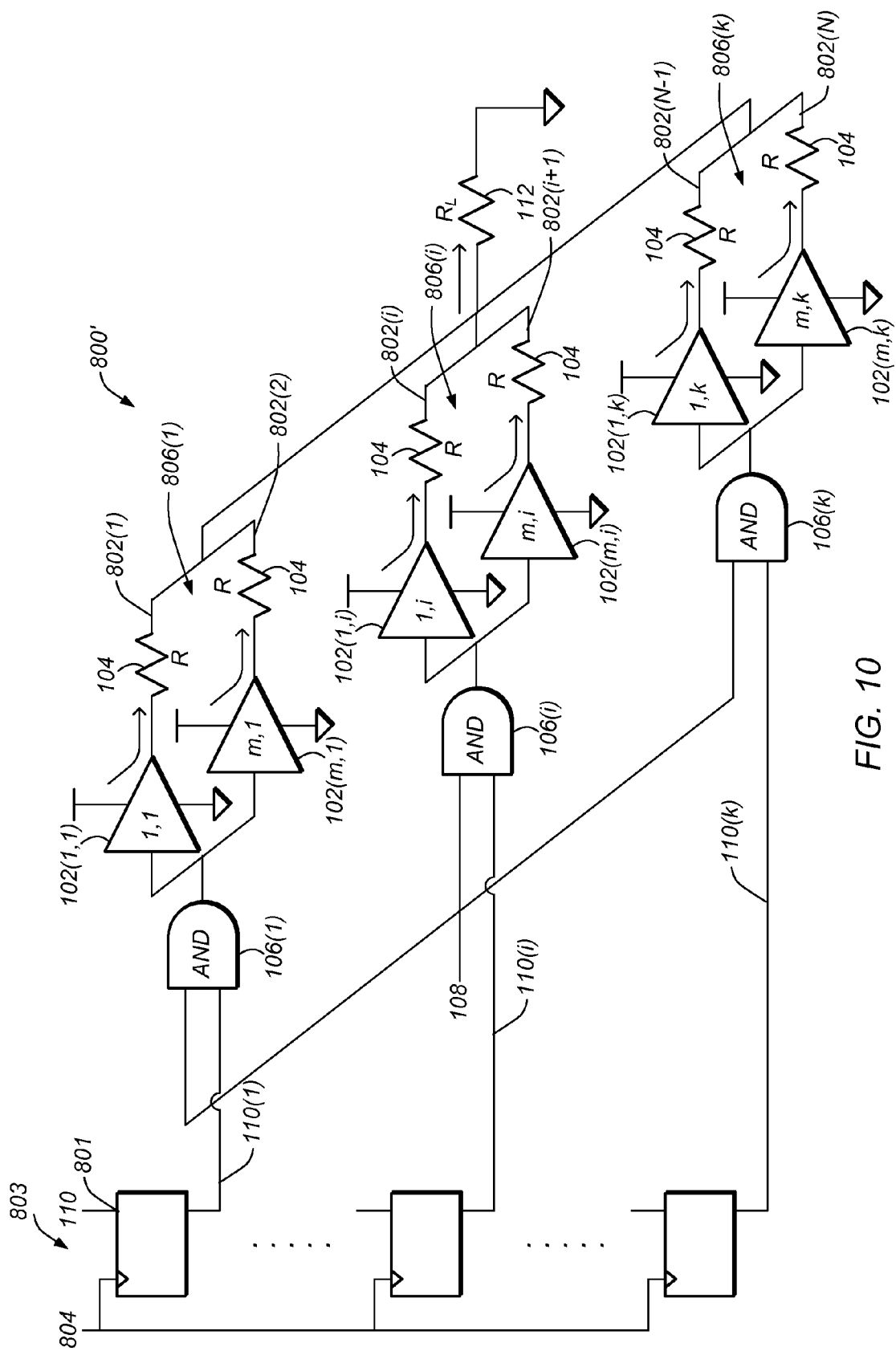
FIG. 10 depicts a representation of another embodiment of a transmitter architecture a ramping current profile implemented by turning on driver legs group by group.

FIG. 10 depicts a representation of another embodiment of a transmitter architecture with a ramping current profile implemented by turning on driver legs group by group. Transmitter 800' may include N number of legs 802 with the legs being grouped into k number of groups 806 (e.g., groups 806(1) through 806(k)). Each group 806 may include m number of legs such that $N=k\times m$. Thus, each leg 802(1-N) includes one driver 102 and one termination resistor 104 with each driver being identified as driver 102(m,k), where m is the leg number in the group and k is the group number.

In certain embodiments, each group 806(1-k) is controlled by a single, individual enable signal 110(1-k). Thus, transmitter 800' uses k number of enable signals 110 instead of N number of enable signals (such as the embodiment of transmitter 800 depicted in FIG. 8). Reducing the number of enable signals 110 also reduces the number of flip-flops (phases) to k instead of N and the number of logic gates 106 (k number of logic gates are needed). In order for transmitter 800', depicted in FIG. 10, to have the same transition time ($t_0$) as transmitter 800, depicted in FIG. 8, the frequency of clock 804 may be reduced by k. Reducing the frequency of clock 804 by k may reduce the power consumption overhead by $k^2$.

Figure 11A:
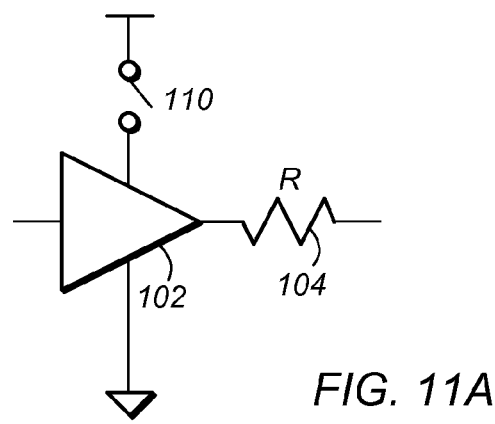
FIG. 11A depicts a representation of an example of an enable signal being provided at the supply of a driver.
Figure 11B:
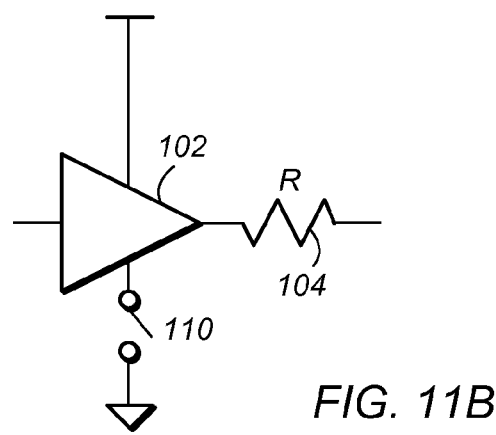
FIG. 11B depicts a representation of an example of an enable signal being provided at the ground of a driver.
Figure 11C:
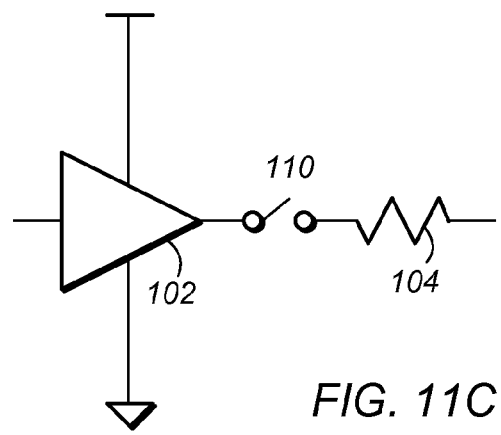
FIG. 11C depicts a representation of an example of an enable signal being provided at the output of a driver.

In some embodiments, enable signals 110 provided in transmitter 800, depicted in FIG. 8, and/or transmitter 800', depicted in FIG. 10, are not provided at the input (e.g., not provided at logic gate 106). For example, enable signals 110 may be provided at the supply, ground, and/or output of one or more of drivers 102. FIG. 11A depicts a representation of an example of enable signal 110 being provided at the supply of driver 102. FIG. 11B depicts a representation of an example of enable signal 110 being provided at the ground of driver 102. FIG. 11C depicts a representation of an example of enable signal 110 being provided at the output of driver 102.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A semiconductor transmitter device, comprising:
an input for receiving an enable signal that signals the transmitter to be turned on;
a plurality of driver legs, wherein each driver leg comprises a driver and a termination resistor;
a shift register for deriving a plurality of individual enable signals from the received enable signal;
a clock coupled to shift register, wherein the clock controls when each of the individual enable signals are provided to one or more of the driver legs, wherein the clock allows a first individual enable signal to be provided when the enable signal is received, and wherein the clock allows each remaining individual enable signal to be provided at a desired time after the enable signal is received; and
a load coupled to the plurality of driver legs.

2. The device of claim 1, wherein the clock controls each of the remaining individual enable signals to be provided at different times.

3. The device of claim 1, wherein the clock comprises a clock period, and wherein the clock controls the remaining individual enable signals to be provided one at a time after each clock period.

4. The device of claim 1, wherein the clock controls each of the individual enable signals to be provided to the driver legs such that the transmitter turns on with a ramping current profile, wherein the ramping current profile comprises a sloped ramp between onset of the received enable signal and a selected time after the onset, and wherein the ramping current profile comprises a substantially constant current after the selected time.

5. The device of claim 1, wherein each driver leg is provided with a different individual enable signal.

6. The device of claim 1, wherein the plurality of driver legs is grouped into two or more groups of driver legs, and wherein each group of driver legs is provided with a different individual enable signal.

7. The device of claim 1, further comprising a plurality of logic gates, wherein at least one individual enable signal is provided to each of the logic gates, wherein an input signal is also received at each of the logic gates, and wherein each logic gate provides an output signal to at least one driver when both the input signal and the individual enable signal are received at the logic gate.

8. A method, comprising:
receiving an enable signal at a transmitter of a semiconductor device;
deriving a plurality of individual enable signals from the received enable signal;
providing a first individual enable signal to a first set of driver legs of the transmitter when the enable signal is received, wherein each driver leg comprises a driver and a termination resistor; and
providing each of the remaining individual enable signals to one or more additional sets of driver legs of the transmitter at a desired time after the enable signal is received.

9. The method of claim 8, wherein each of the remaining individual enable signals is provided at a different time.

10. The method of claim 8, further comprising controlling the desired time each of the remaining individual enable signals is provided with a clock.

11. The method of claim 8, further comprising providing each of the remaining individual enable signals one at a time after a selected time period.

12. The method of claim 8, further comprising providing the plurality of individual enable signals to the sets of driver legs such that the transmitter turns on with a ramping current profile, wherein the ramping current profile comprises a sloped ramp between onset of receiving the enable signal and a selected time after the onset, and wherein the ramping current profile comprises a substantially constant current after the selected time.

13. The method of claim 8, further comprising turning off the individual enable signals when the enable signal is no longer received at the transmitter, wherein turning off the individual enable signals comprises:
turning off the first individual enable signal to the first set of driver legs of the transmitter when the enable signal is no longer received at the transmitter; and
turning off each of the remaining individual enable signals to the additional sets of driver legs of the transmitter at a desired time after the enable signal is no longer received at the transmitter.

14. The method of claim 13, further comprising turning off the individual enable signals with a ramping current profile, wherein the ramping current profile comprises a sloped ramp between when the enable signal is no longer received at the transmitter and a selected time after the enable signal is no longer received at the transmitter, the transmitter being turned off after the selected time.

15. An integrated circuit device, comprising:
one or more input/output blocks, wherein at least one input/output block comprises a transmitter, the transmitter comprising:
an input for receiving an enable signal that signals the transmitter to be turned on;
a plurality of driver legs, wherein each driver leg comprises a driver and a termination resistor;
a shift register for deriving a plurality of individual enable signals from the received enable signal;
a clock coupled to shift register, wherein the clock controls when each of the individual enable signals are provided to one or more of the driver legs, wherein the clock allows a first individual enable signal to be provided when the enable signal is received, and wherein the clock allows each remaining individual enable signal to be provided at a desired time after the enable signal is received; and
a load coupled to the plurality of driver legs;
one or more additional integrated circuit components; and
a power grid coupled to the input/output blocks and the additional integrated circuit components.

16. The device of claim 15, wherein at least one of the additional integrated circuit components comprises a processor.

17. The device of claim 15, wherein at least one of the additional integrated circuit components comprises a clock generator.

18. The device of claim 15, wherein at least one of the additional integrated circuit components comprises a digital baseband.

19. The device of claim 15, wherein the clock controls each of the remaining individual enable signals to be provided at different times.

20. The device of claim 15, wherein the clock controls each of the individual enable signals to be provided to the driver legs such that the transmitter turns on with a ramping current profile, wherein the ramping current profile comprises a sloped ramp between onset of the received enable signal and a selected time after the onset, and wherein the ramping current profile comprises a substantially constant current after the selected time.

* * * * *